April 28, 1970   F. J. FINK   3,508,311
INDEXING TABLE

Filed Nov. 29, 1967   4 Sheets-Sheet 1

INVENTOR.
FRANK J. FINK
BY
McNENNY, FARRINGTON, PEARNE & GORDON

ATTORNEYS

April 28, 1970  F. J. FINK  3,508,311
INDEXING TABLE
Filed Nov. 29, 1967  4 Sheets-Sheet 2

INVENTOR.
FRANK J. FINK
BY
McNENNY, FARRINGTON, PEARNE & GORDON
ATTORNEYS

April 28, 1970  F. J. FINK  3,508,311
INDEXING TABLE

Filed Nov. 29, 1967  4 Sheets-Sheet 3

INVENTOR.
FRANK J. FINK
BY McNENNY, FARRINGTON, PEARNE, & GORDON
ATTORNEYS

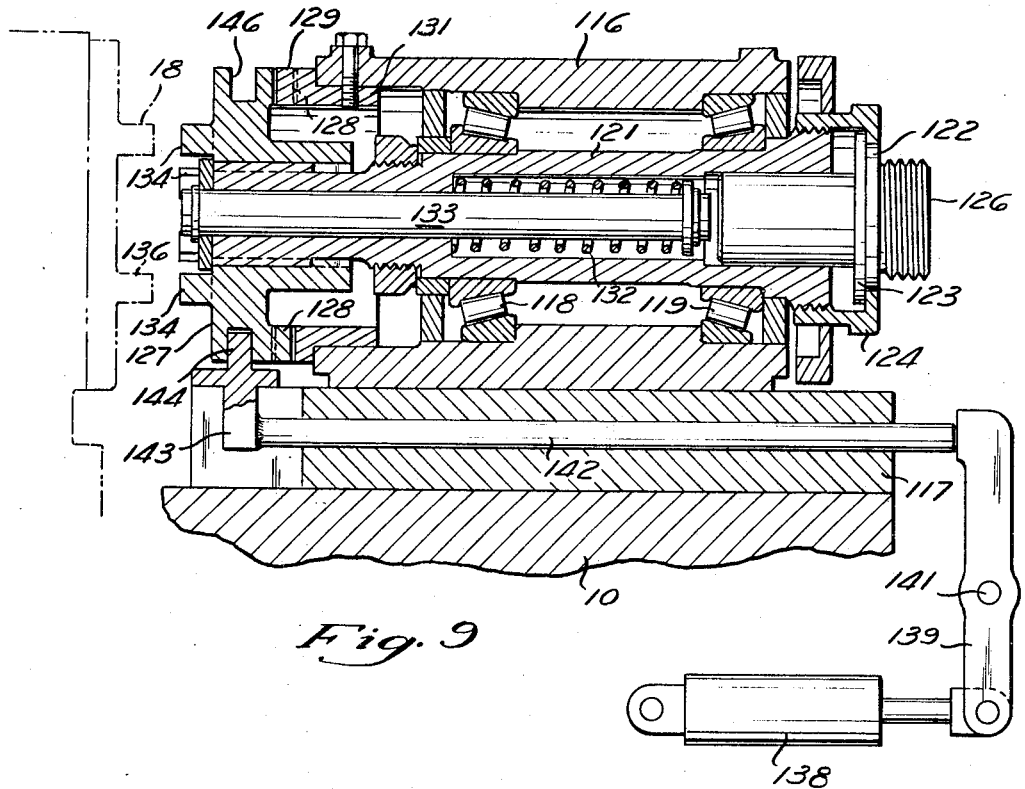

3,508,311
INDEXING TABLE
Frank J. Fink, Chardon, Ohio, assignor to Imperial Manufacturing & Engineering Co., Middlefield, Ohio, a corporation of Michigan
Filed Nov. 29, 1967, Ser. No. 686,641
Int. Cl. B23p 23/00
U.S. Cl. 29—38                                        12 Claims

ABSTRACT OF THE DISCLOSURE

An indexing table is disclosed which includes a table provided with a tubular support journaled on the base. A central drive provides power adjacent to the center of the table and is mounted on and driven by members which extend through the tubular support. Two separate indexing drives are provided, one for indexing rotation and one for continuous rotation. Three locking devices are symmetrically located around the table to precisely position and support the table.

BACKGROUND OF THE INVENTION

This invention relates to a novel and improved indexing table which operates with precision and which provides a basic indexing table assembly adapted to be modified or rearranged so that it can be used in a large variety of machine systems.

PRIOR ART

Generally in the past indexing tables have been designed for use in a particular type of machine system. The operation and use of such indexing tables is normally relatively inflexible and a given table arrangement cannot be used in machine systems which require functional operation differing in any material respect from the machine system for which the table was initially designed. Further most indexing tables have relied upon the main bearing to provide the principal structure for resisting or absorbing working loads. Therefore, such tables have not, in most cases, been capable of maintaining precise workpiece position when high working loads are applied to the workpieces.

SUMMARY OF INVENTION

This invention in one of its broader aspects provides a basic indexing assembly which is provided with a central power drive at one or more selected locations adjacent to the center of the table. Such a central power drive can be used for a variety of purposes. For example, it may be used to rotate a workpiece while it is positioned in one or more predetermined work positions. It can also be used to facilitate loading and unloading of the workpieces on a work holder. Further it can be used to drive tools operable to machine the side of the workpiece adjacent to the center of the table.

In accordance with another of the broader aspects of this invention, a basic indexing table is provided which can be operated to sequentially produce two completely different modes of operation. In one mode of operation the table turns continuously and in the other mode of operation the table turns in a step-by-step indexing manner to progressive indexing positions. Such dual mode operation permits sequential turning-type machining of the workpieces and also spot-type machining at selected locations on the workpieces.

In accordance with still another of the broader aspects of this invention an indexing table is provided with locking assemblies to precisely position the table in each of its work positions. In the illustrated embodiment three power-operated lock pin assemblies are provided at symmetrically arranged locations around the periphery of the table. These assemblies all operate when the table reaches an indexed position to provide accurate final positioning of the table. Further they provide rigid support for the table, independent of the main table bearings, which resist or absorb the work loads on the table without any appreciable deflection of the table structure. Therefore, this invention provides an indexing table incorporating novel and improved means to precisely position the workpiece even when substantial workloads are applied.

OBJECTS OF INVENTION

It is an important object of this invention to provide an indexing table incorporating novel and improved power drive means at selected locations adjacent to the center of the table.

It is another important object of this invention to provide a novel and improved indexing table which is capable of operating in several modes of operation.

It is still another important object of this invention to provide a novel and improved indexing table incorporating means to precisely position the table even when relatively large workloads are applied thereto.

Further objects and advantages will appear from the following description and drawings wherein:

FIGURE 7 is a schematic fragmentary side elevation of a clutch mechanism for connecting the indexing drive to the table;

FIGURE 8 is a fragmentary plan view taken generally along 8—8 of FIGURE 7; and,

FIGURE 9 is a side elevation in longitudinal section of a tool holder incorporating a clutching mechanism adapted to be driven by the central drive of the indexing table.

Figure 1:
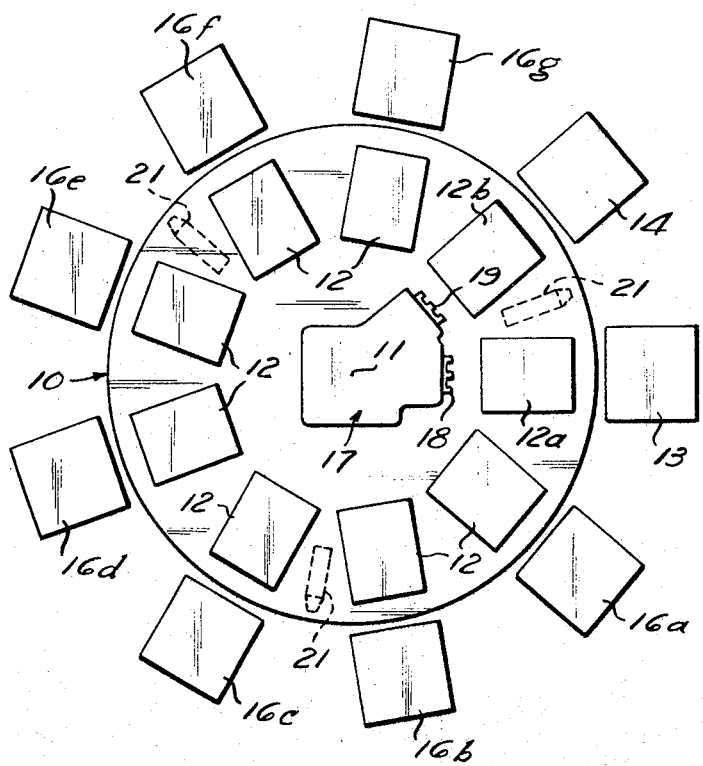
FIGURE 1 is a schematic plan view of an indexing table incorporating this invention illustrated in a machine system to sequentially perform a series of operations on workpieces as they are progressively moved to the various work positions.

FIGURE 1 schematically illustrates one form of machine system in which an indexing table incorporating this invention is particularly suited. In this system the table 10 is journaled for rotation about the vertical axis 11. The drive, described in detail below is arranged to rotate the table through an arc of 40° between each indexing position. Consequently there are nine indexing positions through which the table progressively moves in returning to its initial position. Mounted on the table 10 are nine work holders 12 represented schematically by the boxes. The work holders 12 are mounted on the table symmetrically around the axis 11 as illustrated.

In this illustrated embodiment, automatic loading of the workpieces is provided at a loading station 13 and automatic unloading is provided at an unloading station 14. The various elements are arranged so that the work holders 12 are sequentially positioned at the loading station 13 so that a workpiece may be automatically positioned and mounted on the work holder. The operation of the indexing table 10 sequentially moves each work holder 12 from the loading station 13 to each of seven work stations 16a through 16g. At each of these work stations 16a through 16g a separate operation is performed on the workpieces carried by the work holders 12 and when the operation is completed at the work stations 16g, all of the operations performed in this machine system are completed. The workpiece then moves to the unloading station 14 where it is automatically removed from the adjacent work holder.

A central power drive 17 is located at the center of the table 10 and is mounted so that it remains in the illustrated position as the indexing table 10 rotates. Here again the structure and operation of the power drive is discussed in more detail below. The power drive 17 includes an output clutch member 18 aligned with the loading station 13 and a second output clutch member 19 aligned with the unloading station 14. In the illustrated embodiment, the clutch member 18 is engaged by a mating member carried by the work holder 12a which is positioned at the loading station to rotate the workpiece support element to thread a workpiece onto the work holder 12a. Here again the structure and operation of the work holder is discussed in detail below. A similar but opposite action occurs at the unloading station 14 at which the output clutch member powers the work holder 12b to thread the workpiece off of the work holder 12b.

Three lock pins 21 are mounted on the machine base at symmetrically located positions around the axis 11 and are adapted to extend radially into mating openings in the table 10 to precisely position the table in each of its indexed positions and to provide a rigid structure capable of absorbing work loads applied to the workpiece at the various work stations. Each of the lock pins 21 is power-operated to extend for locking the table each time the table moves to an indexing position and to retract to release the table for indexing during the step-by-step cyclic rotation of the table.

With this arrangement the main table bearings are not relied upon to absorb working loads or to locate the table. Instead the table is supported at three spaced locations adjacent to its periphery by the lock pins. Such a three point support at widely spaced locations insures precise positioning of the table and resists deflecting or movement of the table when working loads are encountered. Here again the structural detail and the operation of the locking system is discussed in detail below.

Figure 2:
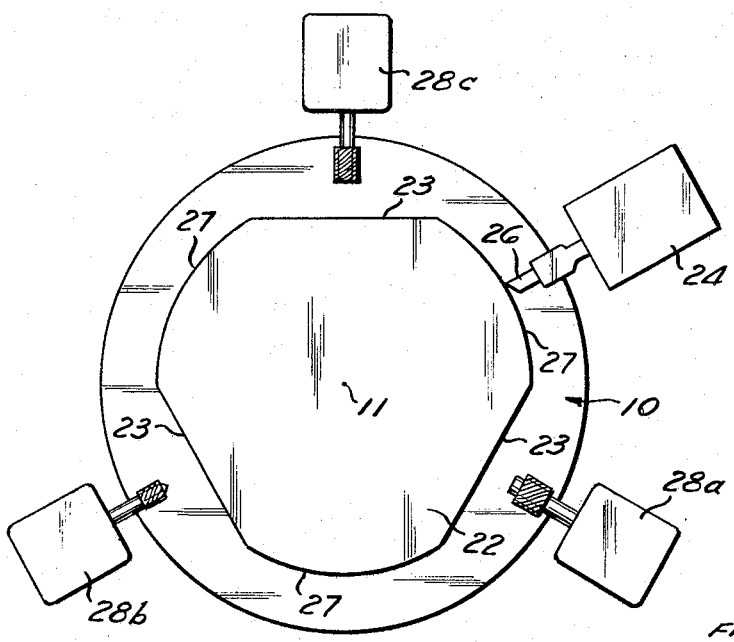
FIGURE 2 is a schematic plan view of an indexing table incorporating this invention illustrated in another machine system operable to sequentially perform lathe-type turning operations followed by indexing-type progressive machining operations.

FIGURE 2 schematically illustrates another mode of operation and a second type of machine system to which this table is particularly well suited. In this machine system the table 10 is again journaled for rotation about a central axis 11. However, the machine system of FIGURE 2 is arranged to provide lathe-type turning of a workpiece 22 in one mode of operation and progressive machining at predetermined locations on a workpiece 22 when the table operates with a second mode of operation.

The illustrated workpiece 22 is provided with three symmetrically located faces 23. In this system a tool holder 24 is provided with a turning-type tool 26 which moves into engagement with the workpiece 22 while the table 10 rotates the workpiece 22 in a continuous manner. Therefore, in this mode of operation the machine system does lathe-type turning of the workpiece 22 producing arcuate sections 27 between the faces 23.

After the turning-type machining is completed, the indexing table 10 returns to normal indexing operations to progressively position each of the faces 23 adjacent to each of the tool holders 28a through 28c and each of the faces 23 is appropriately machined by the tools carried by the tool holders 28a through 28c.

In this particular illustrated embodiment of FIGURE 2, a single workpiece 22 is mounted on the table and the central power drive 17 of FIGURE 1 is removed. It should be understood, however, that dual mode operation can be used with a plurality of workpieces mounted on separate work holders or that a central drive of the type illustrated in FIGURE 1 can be used to perform machining operations on the interior of a hollow or tubular workpiece.

Figure 3:
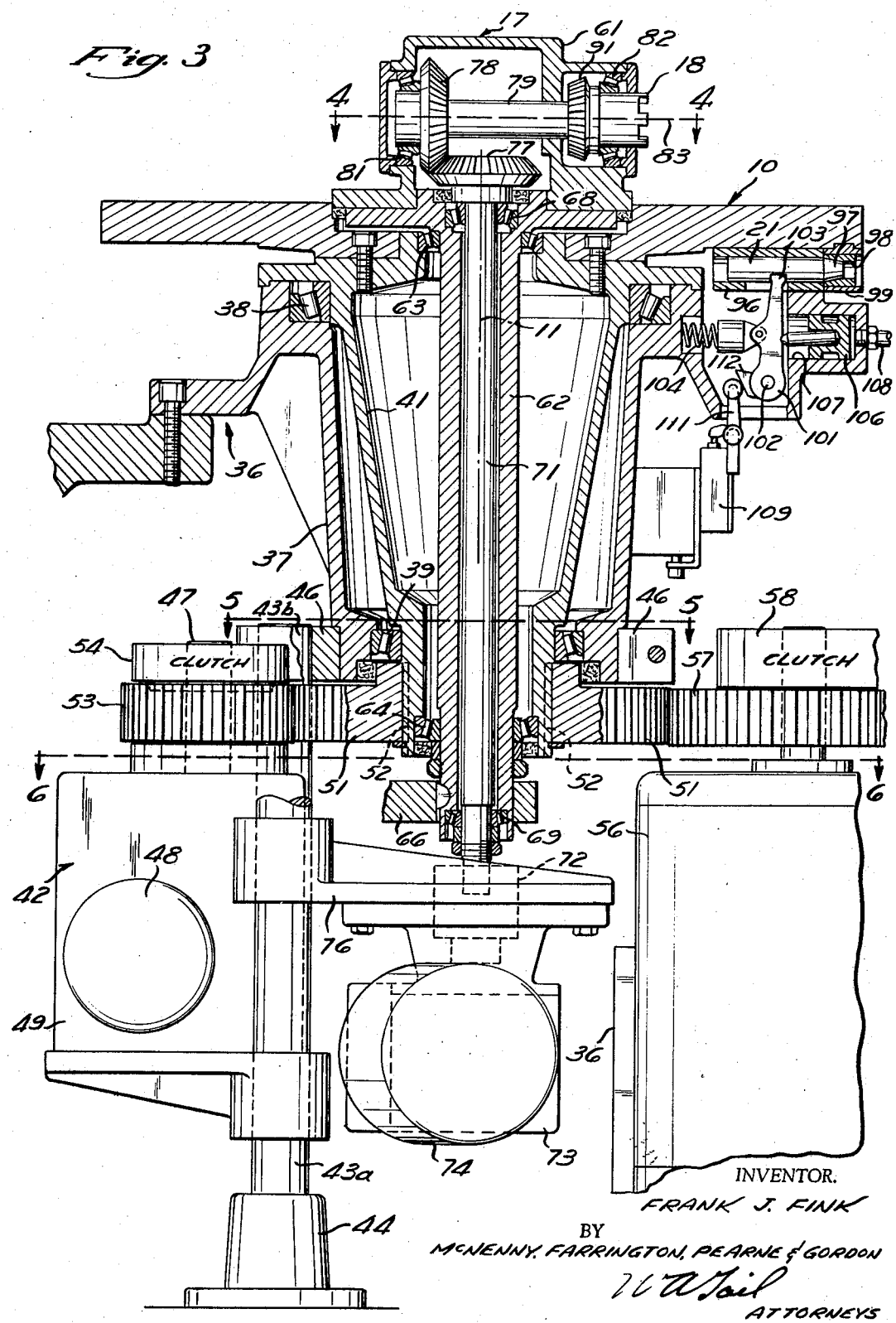
FIGURE 3 is a side elevation, partially in longitudinal section, illustrating the assembled indexing table in accordance with one preferred embodiment of this invention.
Figure 4:
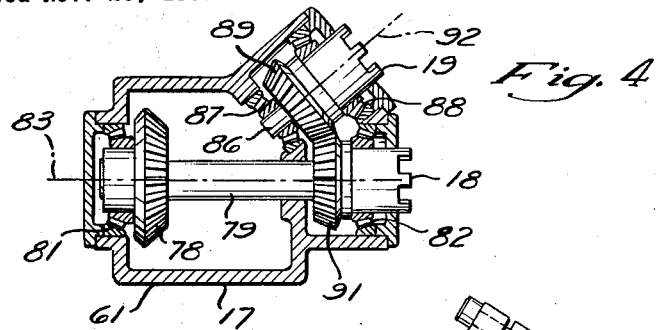
FIGURE 4 is a fragmentary section taken generally along 4—4 of FIGURE 3.
Figure 5:
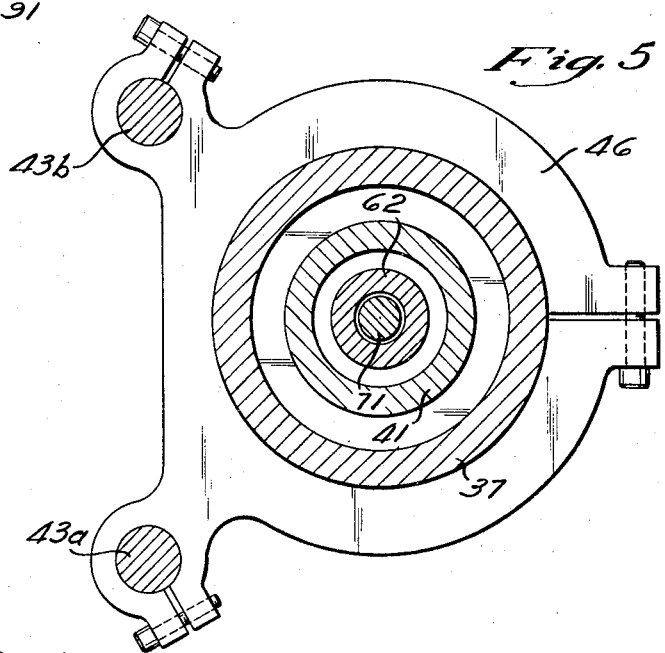
FIGURE 5 is a fragmentary section taken generally along 5—5 of FIGURE 3.

FIGURE 3 illustrates the structural detail of an assembled indexing table incorporating this invention. The table is supported on a base assembly 36 which provides a tubular bearing support 37. Rotatably mounted on spaced bearings 38 and 39 is a tubular table support 41 which is bolted to and supports the table 10 for rotation about the central axis 11.

There are two separate drives each of which is operable to rotate the table 10. The first drive is an indexing drive 42 supported on spaced mounting rods 43a and 43b best illustrated in FIGURE 6. The lower ends of these rods are anchored in base plates 44 and the upper ends are anchored in a clamp ring 46 secured to the lower end of the bearing support 37. The indexing drive may be of any suitable type such as the Ferguson drive or the like so long as it produces intermittent rotation of an output shaft 47 through a predetermined arc each time the drive operates. In the illustrated drive an electric motor 48 is mounted on the side of a gearbox 49 to power the indexing drive and cause intermittent rotation of the output shaft 47.

Mounted on the lower end of the table support 41 is a ring gear 51 which is provided with keys 52 to prevent relative rotation therebetween. Mounted on the output shaft 47 of the indexing drive is a drive gear 53 which engages the ring gear 51. The drive gear 53 is not directly connected to the output shaft 47 but can be drivingly connected thereto by a releasable clutch 54.

When the clutch 54 is engaged, indexing rotation of the output shaft 47 is transmitted to the ring gear 51 and causes rotation of the indexing table 10. The indexing drive 42 and the gears 53 and 51 are arranged so that the indexing table is rotated through a desired number of degrees between indexing positions each time the index drive operates. For example, in the embodiment of FIGURE 1, the indexing drive is arranged to produce 40° of rotation of the table 10 each time the indexing drive 42 operates. By appropriately selecting the gear sizes and the indexing drive other amounts of indexing rotation can be obtained.

The second separate drive includes a motor 56 supported by the base assembly 36 on the side of the central axis 11 remote from the indexing drive 42. This drive provides the continuous rotation of the table which may be used for lathe-type turning as described above in connection with FIGURE 2. The motor 56 is releasably connected to a drive gear 57 by a releasable clutch 58 which in turn meshes with the ring gear 51. The controls for the two drives are arranged so that only one of the clutches 54 and 58 are engaged at a given time so that when the motor 56 is operated to continuously rotate the table 10 the clutch 54 is disengaged. Similarly, when the indexing drive is operating, the clutch 58 is disengaged.

FIGURES 7 and 8 illustrate schematically one type of clutch 54 which may be used to connect the indexing drive to the gear 53. This clutch is arranged so that it can engage only when the output shaft 47 of the indexing drive is in one predetermined orientation with respect to the gear 53. With this arrangement, drive 42 is properly synchronized with the table and will index the table to predetermined positions which do not change each time the clutch 54 operates. In this schematically illustrated clutch, a clutch member 151 is splined to the output shaft 47 so that it is fixed against rotation relative thereto while being axially slidable. An actuator schematically represented at 152 is provided to raise and lower the clutch element 151. The clutch element 151 is formed with a plurality of axially extending holes spaced around the output shaft 47 with each hole at a different distance from the axis thereof. Mating pins 153 are provided on the gear 53 and are located so that when the gear is in a single predetermined orientation with respect to the clutch member 151 the pins are aligned with the corresponding holes 154 and the clutch member 151 can drop down to engage and drive the gear 53. The clutch member 151 cannot, however, engage until this predetermined orientation is reached.

Figure 6:
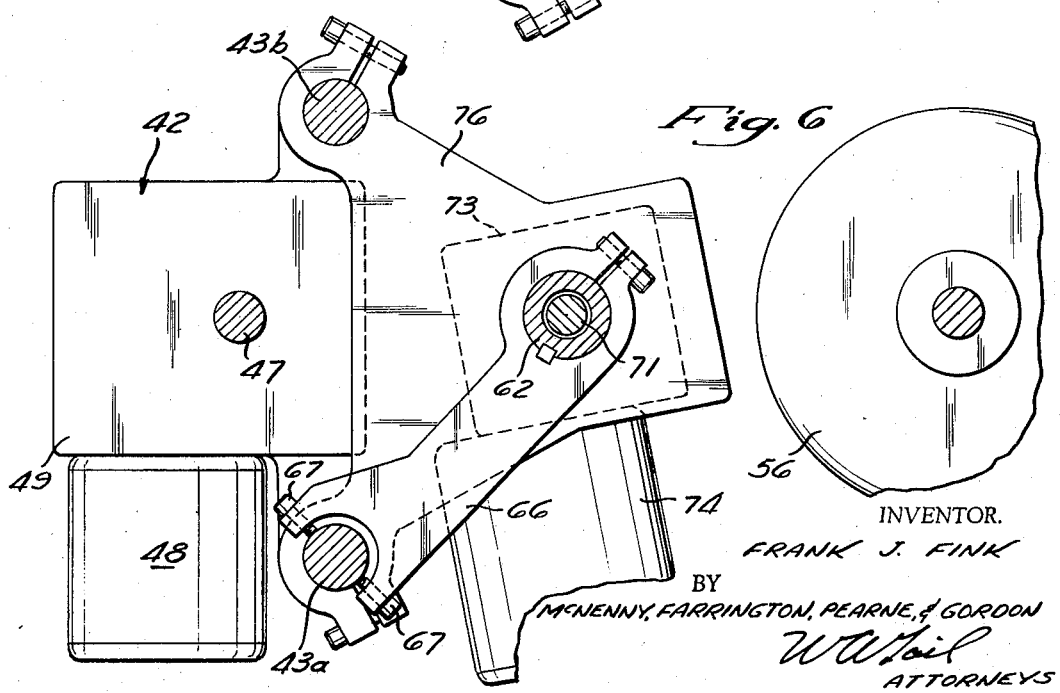
FIGURE 6 is a fragmentary section taken generally along 6—6 of FIGURE 3.

A third and separate drive system is provided for the central power drive unit 17. In order to support the housing 61 of the central power drive 17, a tubular member 62 is attached to the housing 61 and is journaled on spaced bearings 63 and 64 within the table support 41. The various elements are arranged so that the axis of the bearings 63 and 64 is coaxial with the axis of the bearings 38 and 39. Therefore, the tubular member 62 does not move laterally when the table support 41 rotates. Mounted on the lower end of the tubular member 62 and keyed against rotation relative thereto is a torque arm 66. The opposite end of the torque arm 66 is provided with a yoke which fits around the support rod 43a as illustrated in FIGURE 6. Therefore, the tubular member 62 is fixed against rotation by the torque arm and is supported within the table support 41 so that it is fixed against movement relative to the base assembly 36. Adjusting screws 67 are provided in the torque arm 66 on opposite sides of the support rod 43a to provide fine adjustment of the orientation of the housing 61.

Journaled within the tubular member 62 on spaced bearings 68 and 69 is a drive shaft 71. The lower end of the drive shaft 71 is connected through a clutch 72 (illustrated in FIGURE 3) to the output shaft of a gear box 73. A motor 74 is mounted on the side of the gear box 73 to power the central drive. The gear box itself is supported on a mounting bracket 76 secured to the two support rods 43a and 43b as best illustrated in FIGURE 6.

Mounted on the upper end of the drive shaft 71 is a bevel gear 77 which meshes with a second bevel gear 78 on a cross shaft 79. The cross shaft 79 is journaled on spaced bearings 81 and 82 for rotation about an axis 83 aligned with the loading station 13. The end of the cross shaft 79 is provided with a dog clutch half 18 which is adapted to engage a mating clutch half on the work holders 12 in the manner described in detail below. A second shaft 86 is journaled in the housing 61 on bearings 87 and 88 and is provided with a bevel gear 89 which meshes with a bevel gear 91 on the cross shaft 79. In the illustrated embodiment the shaft 86 rotates about an axis 92 aligned with the unloading station 14 at the same speed as the shaft 79 but in an opposite direction. Here again a dog clutch half 19 is provided on the shaft 86.

The mechanism for locking the table in each of its indexed positions is illustrated in FIGURE 3. It should be understood that even though only one of these mechanisms appears in FIGURE 3, there are two additional similar mechanisms peripherally spaced around the table 10. The locking mechanisms each include the lockpin 21 slidably mounted in a tubular slide bearing 96 for radial movement toward and away from the axis 11. The slide bearing 96 is mounted on the bearing support 37 so that the lockpin 21 is accurately positioned. The forward end of the lockpin 21 is formed with a conical end 97 adapted to fit into the adjacent one of a plurality of mating and tapered openings formed in bearing rings 98 which are in turn supported in a ring 99 which is mounted on and extends around the periphery of the table 10. In the machine system illustrated in FIGURE 1 there are nine indexing positions and three lock pins. In such a machine nine accurately positioned bearing rings 98 are mounted on the table and located so that one ring is in alignment with each locking pin in each position of indexing.

A pivot arm 101 is pivoted at 102 on the bearing support 37 and is provided with an upper end 103 which projects into a notch in the lockpin 21. A spring 104 biases the pivot lever 101 in a clockwise direction as illustrated in FIGURE 3 and in turn resiliently urges the lockpin 21 toward the locked position illustrated. A fluid actuator including a piston 106 slidably mounted in a bore 107 operates to overcome the action of the spring 104 and retract the lockpin 21 to a release position when the lock is to be released for indexing movement of the table. Fluid under pressure can be admitted to the bore 107 through a pressure line 108 which connects to a suitable control valve (not illustrated). A switch 109 is provided with an operating arm 111 which engages a cam 112 on the pivot arm 101 to provide a control signal to indicate when the lockpin 21 is in the locked and released positions.

When the table moves to each indexing position, the pressure line 108 is exhausted and the three lockpins 21 extend under the action of their associated springs 104 until the conical end 97 seats in the adjacent bearing ring 98. A camming action is provided by the conical end during extension to move the table 10 a small amount, if necessary, to its precise indexed position. After the table is locked in its position, the three lockpins 21 provide a rigid support for the table to prevent its movement or deflection under workloads applied thereto. The number of lockpins can be increased so long as the total number of pins is evenly divisible into the total number of indexed positions. With this structure the main bearings of the table are not relied upon to insure precise positioning of the table in each of the indexed positions.

FIGURE 9 illustrates one form of work holder 12 which is particularly suited for use with an indexing table incorporating this invention. The work holder 12 includes a frame 116 supported by a base 117 on the table 10. Journaled within the frame 116 by spaced bearings 118 and 119 is a hollow spindle 121. Mounted on the outer end of the spindle is a workpiece holder 122. A ring nut 124 threads onto the spindle 121 and engages the flange 123 on the holder 122 to secure the work holder 122 in place. A taper may also be used to lock the parts. In this embodiment the workpiece holder 122 is provided with a threaded extension 126 adapted to be threaded into the end of a workpiece to support such workpiece as it is carried by the indexing table through the various work positions.

In order to connect the spindle 121 to the dog clutch halves 18 and 19 at the loading and unloading stations, a dog clutch half 127 is provided on each work holder. The clutch half 127 is splined to the inner end of the spindle 121 so that it is locked against rotation relative thereto but is axially movable. When the dog clutch half 127 is in the position illustrated in FIGURE 9, projections 128 on the dog clutch half extend into a recess between mating projections 129 formed on a ring 131 mounted on the housing 116. In this position the dog clutch half 127 and spindle 121 are locked against rotation relative to the housing. A spring 132 and pull rod 133 operate to resiliently urge the dog clutch half toward the illustrated position so that the clutch normally maintains the dog clutch in the locking position.

When it is desired to connect the spindle 121 for rotation by the dog clutch half 18, the dog clutch half 127 is moved to the left (as viewed in FIGURE 9) until the projections 134 interengage projections 136 on the dog clutch half 18. The various elements are proportioned so that the projections 128 and 129 disengage before the projections 134 and 136 engage. When the clutch halves 18 and 127 engage, the central power drive 17 rotates the spindle.

Power operation of the dog clutch half 127 is provided by a piston and cylinder actuator 138 which is mounted on the machine base and is operable to rotate a rocker arm 139 in an anticlockwise direction from the illustrated position about its pivot 141 on the base of the machine. A push rod 142 is carried by the case 117 and is positioned in alignment with the upper end of the rocker arm 139 when the particular work holder 12 is in the indexed positions adjacent to either the loading or unloading stations. The other end of the push rod 142 carries a yoke 143 having a projection 144 extending into a groove 146 in the dog clutch half 127. With this connection movement of the push rod 142 to the left shifts the dog clutch half 127 into engagement with the adjacent dog clutch half 18 while permitting rotation with respect to the yoke 143. It should be understood that a similar actuator 138 and the rocker arm 139 is provided at the appropriate position to engage a push rod or a work holder at the unloading position.

With this arrangement loading and unloading of the workpiece is greatly facilitated. For example, if the workpiece is a part of a typical pipe union, it is first internally threaded at one end. It is then positioned against the threaded projection 126 at the loading station and is held against rotation as the dog clutch half 84 causes the spindle to rotate until the workpiece is firmly mounted and positioned. After the various operations are performed on the workpiece, it is carried to the unloading position. In this position the rotation of the dog clutch half 19 in the opposite direction causes the workpiece to be threaded off of the projection 126.

OPERATION

Various modes of operation can be provided by an indexing table incorporating the present invention. In the mode of operation illustrated in FIGURE 1, a plurality of work holders are mounted on the table 10. Each time the table is indexed by the indexing drive 42, the lockpins 21 are released until the table is positioned in the subsequent indexed position. The lockpins then extend and lock the table in the precise indexed position required and rigidly support the table against movement. If power loading of workpieces is provided, the work holder of the type illustrated in FIGURE 9 is used and the work holder in the position 12a is driven by the dog clutch half 18 for power loading of the workpiece. Engagement of the clutch drive is provided by the actuator 138 illustrated in FIGURE 9. Similarly, the work holder at the position 12b is driven in the opposite direction by the dog clutch half 19 for unloading a workpiece.

Normally the system is operated so that a workpiece is mounted on each of the work holders so that one workpiece is loaded at the loading station 13 in each indexing position and one workpiece is unloaded at the unloading position 14 in each position of the indexing table. Similarly, an operation is performed at the work stations 16a through 16g in each position of the indexing table. The controls for the various motor means and actuators are interconnected for automatic operation. The control circuit has not been illustrated since a person skilled in the art is familiar with various sensing devices and control devices for such circuits. In the machine system of FIGURE 1, the motor 56 may be removed if desired since it is not required in such a system. However, it need not be removed for the proper functioning of the system since the clutch 58 remains disengaged in such a system.

When an indexing table is used in a system of the type illustrated in FIGURE 2, the central power drive 17 may be removed. In this type of system the turning operation is performed by engaging the clutch 58 while the clutch 54 is disengaged and the lockpins are retracted. At the completion of the turning operation, the clutch 58 disengages and the clutch 54 is engaged. Since the clutch 54 is of the type which provides automatic orientation of the indexing drive 42 with the table, proper indexing positioning is achieved. During the indexing operation, the lockpins release to permit indexing and engage to precisely position the table and rigidly support it against the workloads applied thereto.

Although a preferred embodiment of this invention is illustrated, it is to be understood that various modification and rearrangements of parts may be resorted to without departing from the scope of the invention as defined in the following claims.

What is claimed is:

1. An indexing table comprising a base assembly, a table assembly including a table and an elongated tubular member journaled on external spaced bearings on said base assembly for rotation about an axis, an indexing drive operable to progressively rotate said table assembly around said axis to a plurality of indexed positions, a central power head assembly including support means extending axially through said tubular member anl with a portion projecting from the end of said tubular member remote from said table, torque means connected between said projecting portion of said support means and said base assembly preventing relative movement, and also including a housing at the end of said support means adjacent said table, said power head assembly providing a power driven drive element journaled on said housing adapted to provide rotary power at a selected location adjacent to said axis.

2. An indexing table as set forth in claim 1 wherein said support means is a tube, and a power unit is connected to drive said power driven drive element, said power unit including motor means at the end of said tube opposite said housing and a drive shaft extending through said tube from said housing to said motor means.

3. An indexing table as set forth in claim 2 wherein said drive shaft is radially supported for rotation about its axis by at least one bearing supported by said tube.

4. An indexing table as set forth in claim 2 wherein said tube is radially supported by bearings supported by said tubular member.

5. An indexing table as set forth in claim 4 wherein said drive shaft is radially supported for rotation about is axis by at least one bearing supported in said tube.

6. An indexing table as set forth in claim 1 wherein a separate drive is provided to continuously rotate said table.

7. An indexing table as set forth in claim 6 wherein said separate drive and indexing drive are each provided with releasable clutches selectively operable to release said separate drive when said indexing drive is connected to said table and to release said indexing drive when said separate drive is connected to said table.

8. An indexing table as set forth in claim 7 wherein a clutch associated with said indexing drive operates to connect said indexing drive and table only when they are in a predetermined orientation whereby said indexing drive operates to position said table in predetermined indexed positions.

9. An indexing table as set forth in claim 1 wherein a pluarlity of work holders each adapted to support a workpiece are mounted on said table symmetrically around said axis, and clutch means are provided to releasably connect said power driven element and the work holder positioned adjacent to said selected location.

10. An indexing table as set forth in claim 9 wherein a workpiece support spindle is journaled on each work holder, and said clutch means includes a clutch half on each work holder movable between first and second positions, said clutch half when in said first position coupling said power driven element to rotate the associated spindle and when in said second position locking the associated spindle against rotation.

11. An indexing table as set forth in claim 10 wherein a clutch operating linkage is provided on each work holder to move the associated clutch half between said first and second positions, and an actuator is provided to engage and operate the linkage of a work holder positioned at said selected location.

12. An indexing table comprising a base, a table journaled on said base for rotation about an axis, an indexing drive operable to progressively rotate said table to a plurality of indexed positions, a separate drive operable to continuously rotate said table wherein each of said drives is provided with releasable clutches selectively operable to release either of said drives when the other is connected to said table, and said clutch associated with said indexing drive operates to connect said indexing drive and said table only when they are in a predetermined orientation so that said indexing drive operates to position said table in predetermined indexed positions.

References Cited

UNITED STATES PATENTS

| | | | |
|---|---|---|---|
| 2,385,605 | 9/1945 | Bullard | 29—38 |
| 3,011,245 | 12/1961 | Mueller | 29—38 |
| 3,336,823 | 8/1967 | Bonzi | 77—64 |
| 2,086,850 | 7/1937 | Bullard | 74—823 XR |
| 3,245,133 | 4/1966 | Rey | 29—38 |

FOREIGN PATENTS

| | | |
|---|---|---|
| 668,635 | 8/1963 | Canada. |
| 652,927 | 5/1951 | Great Britain. |
| 1,010,047 | 11/1965 | Great Britain. |

FRANCIS S. HUSAR, Primary Examiner

U.S. Cl. X.R.

77—64; 74—823